UNITED STATES PATENT OFFICE.

ERNST TRAINER, OF LANGEN, AND WILHELM HAAGE, OF WALSUM, GERMANY.

MANUFACTURE OF BRIQUETS.

969,504.  Specification of Letters Patent.  Patented Sept. 6, 1910.

No Drawing.  Application filed December 13, 1909.  Serial No. 532,948.

*To all whom it may concern:*

Be it known that we, ERNST TRAINER, a citizen of the German Empire, and a resident of Langen, Hessen, Germany, and WILHELM HAAGE, a citizen of the German Empire, and resident of Walsum, Rheinland, Germany, have invented new and useful Improvements in the Manufacture of Briquets, of which the following is a specification.

Our invention relates to improvements in the art of making compressed bodies or cakes of that class which are made of coal-dust or other comminuted or powdered combustibles or a mixture of any of those materials with fine ore, furnace-dust or the like, and where refuse lye from the pulp-digester used in the manufacture of sulfite wood-pulp is employed as a cement for holding those materials together. While the employment of the lye referred to is already known in the art of briquet-making, it does not make the briquet material or the briquets weatherproof and the object of our invention is to overcome this difficulty.

We attain our object by a preparation of the lye before using it for the purpose indicated. Accordingly we add a quantity of a chromium compound to the said lye and mix it therewith, the efficiency of the lye thus prepared being, as we have found out, the greater, if the mixture is made shortly or rather immediately before mixing the lye with the briquet materials. The preparation may be made some time before it is put to use or the chromium compound may be added even after the lye has been mixed with the briquet materials as a cement, but, as aforesaid, the action of the compound will be better and more economical if it is added just before the above mentioned materials are being mixed.

There is no restriction as to which particular chromium-compound is to be used and chromic acid, soluble chromium-salts and dichromate have been found to be excellent materials for the purpose mentioned, all having the property of making the lye referred to insoluble in water so that briquets made of material prepared as referred to become perfectly weather-proof. As in the manufacture of wood-pulp it may be desirable to add calcium-salts to the lye, these salts are apt to consume a pretty large portion of the chromium compound which portion would be lost for the purpose of this invention. For this reason the quantity of chromium required will be much reduced if the lye, before the chromium is added, is relieved from the calcium-salts which may be done by precipitation. A more economical way, however, is to reduce such salts into insoluble compounds which have not the property of acting upon the chromium-compounds and are thus rendered harmless and this we prefer to do by adding sulfuric acid or soluble sulfates to the lye.

It having further been found out that if sulfates of alumina are added to the lye the quantity of chromium-compound required will be much smaller without impairing the efficiency of the lye, whether or not the latter contains any calcium salts, we prefer to add some sulfate of alumina to the lye in preparing it for the purpose mentioned.

We claim:

1. The process of making weather-proof briquets, which consists in cementing the material to be agglomerated by means of a binding agent containing waste sulfite liquor and a chromium compound.

2. The process of making weather-proof briquets, which consists in cementing the material to be agglomerated by means of a binding agent containing waste sulfite liquor substantially free from soluble calcium compounds, in presence of a chromium compound.

3. The process of making weather-proof briquets, which consists in adding aluminum sulfate and a chromium compound to waste sulfite liquor, and agglomerating the material with the resulting product.

In testimony whereof we have severally signed our names to this specification each in the presence of two subscribing witnesses.

ERNST TRAINER. [L. S.]
WILHELM HAAGE. [L. S.]

Witnesses as to signature of Ernst Trainer:
 JEAN GRUND,
 CARL GRUND.

Witnesses as to signature of Wilhelm Haage:
 OTTO KÖNIG,
 CHAS. J. WRIGHT.